(12) United States Patent  (10) Patent No.: US 8,779,025 B1
Stone  (45) Date of Patent: Jul. 15, 2014

(54) METHOD FOR INCREASING THE WET COEFFICIENT OF FRICTION OF A THERMOPLASTIC ELASTOMER AND COMPOSITION THEREFOR

(76) Inventor: Donald David Stone, Jensen Beach, FL (US)

( * ) Notice: Subject to any disclaimer, the term of this patent is extended or adjusted under 35 U.S.C. 154(b) by 210 days.

(21) Appl. No.: 13/373,322

(22) Filed: Nov. 12, 2011

Related U.S. Application Data

(60) Provisional application No. 61/458,331, filed on Nov. 22, 2010.

(51) Int. Cl.
*C08K 5/01* (2006.01)

(52) U.S. Cl.
USPC ............................ 523/149; 523/150; 524/478

(58) Field of Classification Search
USPC ................................... 523/149, 150; 524/478
See application file for complete search history.

(56) References Cited

U.S. PATENT DOCUMENTS

| | | |
|---|---|---|
| 5,314,940 A | 5/1994 | Stone |
| 7,316,597 B2 | 1/2008 | Skedeleski |
| 2006/0148915 A1 * | 7/2006 | Floyd et al. ..................... 521/61 |

FOREIGN PATENT DOCUMENTS

JP       2001081255 A  *  3/2001

OTHER PUBLICATIONS

Machine translation of JP 2001-081255, Mar. 27, 2001.*

* cited by examiner

*Primary Examiner* — Vickey Nerangis
(74) *Attorney, Agent, or Firm* — Ted Masters

(57) ABSTRACT

A method for increasing the wet coefficient of friction of a thermoplastic elastomer includes adding various ingredients to the thermoplastic elastomer. In one embodiment microcrystalline wax, amorphous polyalphaolefin ethylene copolymer, and a copolymer ethylene/propylene and olefins are added to the thermoplastic elastomer. And in another embodiment, microcrystalline wax and copolymer ethylene/propylene and olefins are added to the thermoplastic elastomer. The above compositions are formed into a sheet which can be used alone as a slip-resistant pad, or can be applied to a desired surface (such as that of a surfboard).

2 Claims, 1 Drawing Sheet

METHOD FOR INCREASING THE WET COEFFICIENT OF FRICTION OF A THERMOPLASTIC ELASTOMER AND COMPOSITION THEREFOR

CROSS REFERENCE TO RELATED APPLICATION

This application claims the filing benefit under 35 U.S.C. §119(e) of U.S. Provisional Application No. 61/458,331, filed Nov. 22, 2010, which is hereby incorporated by reference.

TECHNICAL FIELD

The present invention pertains generally to the coefficient of friction of a thermoplastic elastomer (TPE), and more particularly to a composition and which increases the wet coefficient of friction (COF) of the TPE.

BACKGROUND OF THE INVENTION

Most surfaces become "slippery" when they are exposed to water. However in many instances a slippery surface is not desired and presents a problem. In these instances there is therefore a need for a composition which increases the wet coefficient of friction. For example, surfing traction is one of the most difficult wet COF issues to address. It is a high performance, dynamic sport done at speed while executing radical maneuvers and extreme changes of directions. Surfboards typically have a fiberglass outer surface which can become slippery when wet. As such, at the interface of the surfboard and the surfers feet a specially blended wax is used for traction. However, this wax melts off in high temperatures or wears off during use and needs to be reapplied prior to or during each surfing session. The wax also must have a certain degree of tackiness, but not too great as it will irritate and/or rub the skin off of the surfer. (some surfers do wear rash guards, a light weight nylon vest to protect their chest area from rash or irritation in the chest area). The wax must not have any abrasive particles which would cause skin irritation or abrasion, because when paddling the surfer's skin contacts the deck of the surfboard. In view of the above, it would be advantageous to provide a surfboard surface which has a high wet COE without the need to repeatedly apply wax.

One such possible surface would include a thermoplastic elastomer (TPE) also referred to as thermoplastic rubbers. TPEs are a class of copolymers (typically plastic and synthetic rubber) which exhibit both thermoplastic and elastomeric properties. Some TPE polymers are also known as gels or visco-elactic, is a synthetic rubber like product having the super soft malleable characteristics of Jello®, which also has shock absorbing properties. Most TPE's while dry are very slip-resistant, however if water is added to the surface they become very slippery. One or more additives can be added to chemically modify the TPE polymer to produce the desired high wet COF and other useful properties, but without adding abrasive particles.

To that end, U.S. Pat. No. 5,314,940 to Stone issued in 1994 resolved the wet slipperiness issue in a broad line of TPE's using petrolatum jelly (commonly known as Vaseline) prior to the advent and commercialization of the TPE's referred to as gels or visco-elastic material. The gel/viscoelastic TPE's are commonly infused with an extra-ordinary amount of mineral oil (plasticizer), which gives them the extra softness and flexibility (Jello®-like characteristics).

U.S. Pat. No. 7,316,597 discloses a traction pad for a personal water board. The traction pad utilizes a thermoplastic elastomer (TPE). Additionally, Patent Publication US 2008/0097270 discloses an elastomeric material and discusses possible manufacturer products.

BRIEF SUMMARY OF THE INVENTION

The present invention is directed to a method and composition which increases the wet COF of a TPE. The present invention uses a TPE polymer as the base compound, and adds two or more other compounds (e.g. microcrystalline wax, APOA, and ethylene/propylene and olefins) to enhance the wet COF and other properties of the combination. In final form the compositions comprises a sheet of polymer material (e.g. 0.5 to 3.0 millimeters thick) which can be used by itself, or can be bonded to the surface of an object such as a surfboard. The present invention does the following:

1. Greatly enhances the wet traction of certain TPE polymers without abrasive particles.
2. Only slightly changes the hardness and elongation properties of the TPE material.
3. An additional benefit is that these formulas aid in the bonding of certain of these TPE polymers to a secondary substrate by absorbing the mineral oils and/or changing the polarity and making them more compatible to bonding to another substrate.
4. Very small amounts of the slightly tacky microcrystalline wax (micro-traction) are transferred from the surface of the gel to the surface of the human foot during use greatly enhances the wet traction of the foot, especially in elderly humans where the body oils are greatly reduced and/or not present if the invention is used in the manufacture of bath or showermats for hospitals, residential, or commercial use.
   * Dry skin equals reduced traction (such as in cold weather, skin dries out, difficult to pick up objects with hands, apply hand lotion (restores some of the lost natural body oils) aids in picking up objects. Another example would be a bank teller that touches her finger tips to a pad of wax to enable her to count money without her fingers slipping.
5. The natural characteristics of these gels are known to have good shock absorbing and dampening characteristics in relation to their thickness
6. Conformable—The softness of the composition means increased surface area which means increased traction or grip (as opposed to a harder composition polymer).

Some of the numerous applications of the composition of the present invention are: surfboard traction pads, sports equipment used in wet environments, decks of wakeboards, wake/skate boards, shoe soles for wake/skate boarding, bindings for water skis, mats for clean rooms, shower stalls, bath mats, all types of sporting gloves, golf grips, baseball bats, yachting mats, conveyor belts for delicate fruits, vegetables, or food products, and even for additional chest protection from irritation or abrasion when applied or attached to the chest area of rash guards, the thin nylon vest that surfers wear to protect their chest area from irritation or abrasion when prone paddling. The composition can also be applied to the bottom of disposable booties used in operating room. Another application is handle grips either molded or in tape form that can be applied to paddles used for stand up surfboards and other similar types of equipment used in sports. The composition would help prevent blisters because of its softness and slight transfer of microcrystalline wax to the skin to help prevent skin from drying out completely.

In accordance with an embodiment, a method for increasing the wet coefficient of friction of a thermoplastic elastomer includes:

adding a microcrystalline wax and at least one of (1) an amorphous polyalphaolefin ethylene copolymer, and (2) a copolymer ethylene/propylene and olefins, to the thermoplastic elastomer.

In accordance with another embodiment:

adding both amorphous polyalphaolefin ethylene copolymer and copolymer ethylene/propylene and olefins to the thermoplastic elastomer.

In accordance with another embodiment:

the resulting composition has the following weight ratios;
the thermoplastic elastomer being about 93 weight percent;
the microcrystalline wax being about 2.3 weight percent;
the amorphous polyalphaolefin ethylene copolymer being about 2.3 weight percent; and,
the copolymer ethylene/propylene and olefins being about 2.3 weight percent.

In accordance with another embodiment:

the resulting composition having the following weight ratios;
the thermoplastic elastomer being about 87 weight percent;
the microcrystalline wax being about 4.3 weight percent;
the amorphous polyalphaolefin ethylene copolymer being about 4.3 weight percent; and,
the copolymer ethylene/propylene and olefins being about 4.3 weight percent.

In accordance with another embodiment:

the resulting composition having the following weight rations:
the thermoplastic elastomer being between about 87 weight percent and about 93 weight percent;
said microcrystalline wax being between about 2.3 weight percent and about 4.3 weight percent;
said amorphous polyalphaolefin ethylene copolymer being between about 2.3 weight percent and about 4.3 weight percent; and,
said copolymer ethylene/propylene and olefins being between about 2.3 weight percent and about 4.3 weight percent.

In accordance with another embodiment:

adding copolymer ethylene/propylene and olefins to the thermoplastic elastomer.

In accordance with another embodiment:

the resulting composition having the following weight ratios;
the thermoplastic elastomer being about 83.3 weight percent;
the microcrystalline wax being about 8.3 weight percent; and
the copolymer ethylene/propylene and olefins being about 8.3 weight percent.

Other embodiments, in addition to the embodiments enumerated above, will become apparent from the following detailed description, taken in conjunction with the accompanying drawings, which illustrate, by way of example, the principles of the method and composition.

DETAILED DESCRIPTION OF THE INVENTION

Figure 1:
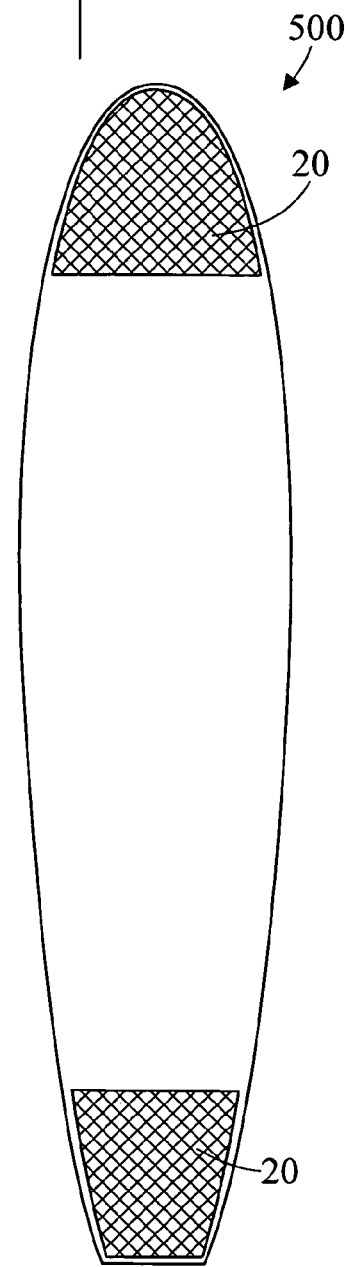
FIG. 1 is a top plan view of surfboard with sheets of the composition of the present invention applied to the top surface; and, FIG. 2 is a top plan view of another surfboard with sheets of the composition of the present invention applied to the top surface.

The present invention utilizes a TPE as the primary ingredient. Once formed through heat and pressure, TPEs can be reformed by re-heating. Conversely thermoset polymers cannot be reformed by reheating or pressure. One particularly useful group of TPE's are known as visco-elastic or gels. These are the super soft polymers where the durometer (hardness) is so low that they are not measured for durometer in the commonly known Shore A or Shore D Scale, but in the specially developed Shore 00 Scale for super soft gel-like materials having a durometer of less than 20 on the Shore A scale.

The method and composition of the present invention adds two or more additives to the TPE. Specifically three additives have been found useful—microcrystalline wax, APOA, and ethylene/propylene and olefins. These three additive copolymers are basic off the shelf materials, commonly used in the plastics industry in a broad spectrum of products and formulas. Some of the more common products are pressure sensitive adhesives (PSA), such as masking tapes, Band aids, bubble gum, hot melt adhesives, surfboard waxes etc and are also processing aids in injection molding. Additionally, there are many additives known as tackifiers for polymers, which enhance the tackiness when mixed into polymer formulations, such as used in masking tape and adhesive notes, can be used. A problem is that many of these tackifiers exhibit excellent tack properties when dry, but when wet with water they become super slick, like water on glass. (certain microcrystalline waxes are a general exception to this rule).

The composition of the present invention can include the following four compounds, which can be used in a variety of combinations and weight percent ratios:

1. Ingredient A—GLS Versaflex® 2003X.
Generic: (TPE low durometer visco-elastic gel)
Main ingredient to be modified to give it wet traction.
Material Characteristics—Soft Rubbery pellet with slight oily feel.
Shore Hardness, 10 sec delay—30, ASTM D2240
Shore hardness 30 Shore 00
Specific Gravity—0.86, ASTM D792, 23/23° C.
Tensile Strength—280 psi ASTM D$12-Dia C, 2 hrs, 23° C.
Elongation at Break—1290%, ASTM D412-Die C, 2 hrs, 23° C.
100% Modulus—9 psi, ASTM D412-Die C, 2 hrs, 23° C.
300% Modulus—15 psi, ASTM D412-Die C, 2 hrs, 23° C.
Tear Strength—40 psi, ASTM D624
Apparent Viscosity @ 200° C. 11170/sec—1300 cPs, ASTM D 3835
Manufacturer:
   GLS thermoplastic Elastomers
   PolyOne Corp.
   833 Ridgeview Dr.
   McHenry, Ill. 60050-7050
   Tel. 1-800-457-8777
alternate Ingredient A (TPE)—Gelsmart® M gel #4125 (a styrenic block copolymer)
Manufacturer:
Gelsmart®
30 Leslie Court
Whippany, N.J. 07981
973-884-8995

Ingredient A is also available as Ultramelt™ M-PTF from Soft Polymers a.k.a. Crinnis Corp. 1835 W. 169$^{th}$ St., Gardena Ca.

2. Ingredient B—Frank Ross Microcrystalline Wax 1275 ML
Generic: Microcrystalline Wax
Primary ingredient giving Versaflex® the wet traction
Material Characteristics—Semi-soft waxy feel & tacky feel
Melting point 170° F.-180° F., needle penetration 77° F., 25-35
Supplier:
    Frank Ross Wax
    970-H New Brunswick Avenue
    Rahway, N.J. 07065
    732-669-0810
3. Ingredient C—Rextac® RT 2585
Generic: Amorphous Polyalphaolefin (APAO) ethylene copolymer
Believed to control the tackiness of the microcrystalline wax at elevated ambient temperatures and trap microcrystalline wax in the Versaflex® to prevent leaching or migration of the wax out of the Versaflex®. May also aid in maintaining the elongation and flexibility of the Versaflex® that the addition or loading of the microcrystalline wax diminished.
Material Characteristics—Hard putty like waxy feel that is somewhat stringy when pulled.
Brookfield Viscosity cps (at 190° C.)-8500
Needle Pen dmm—40
Ring and Ball Softening Point (C.°)—132
Glass Transition (C.°)—−37
Open Time (sec)—60
Tensile Strength (MPA)—0.34, PSI—50
Manufacturer:
    Rextac®
    PO Box 418
    2501 S. Grandview
    Odessa, Tex. 79766
    432 332 0058
4. Ingredient D—Petrolite® EP-700
Generic: copolymer ethylene/propylene and olefins (synthetic waxes)
This may help absorb some of the mineral oil in the Versaflex® and enhance the bonding characteristics of the Versaflex® to other substrates, possibly by changing the polarity of the Versaflex®.
Material Characteristics—Hard random size pellets smaller than a BB very slight waxy feel.
Molecular Weight—650 (GPC)
Viscosity, (cP@ 300° F., 149° C.)—7 (ASTM D-3236)
Melting Point (F.°)—204 (ASTM D-127)
Penetration (0.1 mm@77° F., 25° C.)—6 (ASTM D-1321)
Penetration (0.1 mm@140° F.)—47 (ASTM D-1321)
Branches Molecule (Approx.)—<1
Manufacturer:
    Baker Hughes/Baker Petrolite®
    PO Box 669
    Barnsdall, Okla. 74002
    918 847 2522

In one embodiment of the invention the composition comprises the following ingredient ratios by weight (i.e. weight percent):

| | | |
|---|---|---|
| 1. | TPE (Versaflex® 2003X) | about 93% |
| 2. | Microcrystalline wax (1275 ML) | about 2.3% |
| 3. | APAO (Rextac® RT 2585) | about 2.3% |
| 4. | ethylene/propylene and olefins (Petrolite® EP 700) | about 2.3% |

Respective weight of about 560 grams, about 14 grams, about 14 grams, and about 14 grams produce the approximate weight percent ratios shown above.

In other embodiments of the invention the composition comprises the following ingredient ratios by weight (i.e. weight percent):

| | | |
|---|---|---|
| A. | Ultramelt™ M-PTF | 8.0 grams (about 83.3 weight percent) |
| | Ross Microcrystalline Wax 1275 | 0.8 grams (about 8.3 weight percent) |
| | Petrolite® EP-700 | 0.8 grams (about 8.3 weight percent) |
| | Little or no tackiness to touch | |
| B. | Ultramelt™ M-PTF | 8.0 grams (about 87 weight percent) |
| | Ross Microcrystalline Wax 1275 | 0.4 grams (about 4.3 weight percent) |
| | Petrolite® EP-700 | 0.4 grams (about 4.3 weight percent) |
| | Rextac® 2585 | 0.4 grams (about 4.3 weight percent) |
| | Tacky to touch | |
| C. | Ultramelt™ M-PTF | 12.0 grams (about 87 weight percent) |
| | Ross Microcrystalline Wax 1275 | 0.6 grams (about 4.3 weight percent) |
| | Petrolite® EP-700 | 0.6 grams (about 4.3 weight percent) |
| | Rextac® | 0.6 grams (about 4.3 weight percent) |
| | Tacky to touch | |
| D. | Ultramelt™ M-PTF | 12.0 grams (about 83.3 weight percent) |
| | Ross Microcrystalline Wax 1275 | 1.2 grams (about 8.3 weight percent) |
| | Petrolite® EP-700 | 1.2 grams (about 8.3 weight percent) |
| | Light tackiness to touch | |

It may be appreciated however, that the three additives, can be used singularly with TPE, or in various other combinations and percentages. For example, TPE and only microcrystalline wax could be used, TPE and only APAO used, or TPE and only ethylene/propylene and olefins used. Other possibilities include TPE+microcrystalline wax+APAO, TPE+microcrystalline wax+ethylene/propylene and olefins, and TPE+APAO+ethylene/propylene and olefins. It is noted that all of the additives enhance the wet COF of the TPE if used to modify the TPE by themselves, but can destroy certain desirable properties of the TPE such as elongation and softness. Some examples of extreme formulations and results are shown below:

| | | |
|---|---|---|
| 1. | Versaflex® 2003X | 66% |
| | Microcrystalline wax | 34% |
| Result | | |
| Greatly enhances wet COF (but less wet COF than ideal formula). Makes hard durometer rigid material. Greatly reduces elongation. | | |
| 2. | Versaflex® 2003X | 66% |
| | Rextac RT 2585 | 34% |
| Result | | |
| Gooey putty like mess. Consistency of cold peanut butter | | |
| 3. | Versaflex® 2003X | 66% |
| | Petrolite EP 700 | 34% |
| Result | | |
| Greatly enhances wet COF (but less wet COF of than ideal formula). Makes hard durometer rigid material. Greatly reduces elongation | | |

Processing:
All the weighted ingredients are placed together into a melting kettle and slowly heated to about 350-375° F. and slowly stirred constantly. The heated mixture is then poured into an aluminum mold or any type of suitable mold material sufficient to tolerate the processing temperatures. For high volume production injection molding can be used. Other methods for mixing the ingredients would be through extruders used for mixing hot melt materials and/or reactors commonly known in the chemical processing industry. The compounded ingredients from these mixing processes would then be either injection molded or reheated to a liquid and poured into a suitable mold to produce a finished consumer product. Theory and Comments of how and why the Additives Work:

Microcrystalline waxes blended into the TPE greatly increase the wet traction of the TPE and imparts tackiness. Too much microcrystalline wax and the TPE loses it's softness and elongation properties.

Ethylene/propylene and olefins help to diminish the mineral oils (maybe absorb the mineral oil) in the TPE, aids in bonding to a secondary substrate, also increases wet COF, may also allow microcrystalline wax to migrate to surface, thereby restoring wet traction that may have been lost through time, use, and wear. Also possibly aids in preventing the "rubber eraser effect" which is common in TPE's infused with large quantities of mineral oil. "Rubber eraser" effect is the surface degradation over time of the TPE with large quantities of mineral oil that produce a rubber eraser type debris when rubbed vigorously with the finger.

The APAO combines with and or controls the tackiness of the microcrystalline waxes at elevated ambient temperatures and aids in the wet traction properties. Increase the APOA and the tackiness increases.

Of special note, these are some commonly know manufacturing techniques that can be used in giving the TPE a degree of rigidity if needed for handling and application in the finished product. For example, a piece of non-woven fabric (ex. Pellon 910) or surfacing veil, with sufficient heat resistance (commonly known material & practice) is molded into the back of certain of these products such as the surfboard traction mats to give them a slight rigidity that makes them easier to handle when trying to apply a large piece of gel like material to a substrate with accuracy. (without the nonwoven, the Jello®-like material with a pressure sensitive adhesive on the back would be almost impossible to handle and apply correctly to the substrate). Other known methods of increasing the rigidity of the TPE polymers would be to add a chopped strand material to the gel at some stage in forming the TPE into a finished product. Another known method would be to co-mold another layer of a more rigid/harder polymer to the back or bottom of the traction pad at the time of manufacture. Also the non-woven fabric could be applied after molding the pads with an adhesive.

By adjusting the amount of additives micro-crystalline wax and/or APAO individually or collectively the tackiness of the wet traction can be increased or decreased. For some surfboards extreme tackiness may be required or desired by some surfers under certain conditions.

In other possible embodiments, commonly known methods of reducing the weight of an item (e.g. one made from the compositions disclosed herein) could be employed such as by perforating the item and removing excess material (the same as racing car frames perforated to reduce weight). Or another method of reducing the weight of finished products manufactured with the compositions of the present invention would be to utilize commonly known processing equipment which infuses the hot melt material with air or nitrogen gas immediately prior to molding a finished product or application to a surface. This infusion or entrapment of air or nitrogen gas in the hot melt material, among other advantages greatly reduces the weight of the finished product by creating a foam like material, reduces the amount of material used in the finished product and reduces molding cycle time, among other benefits.

Figure 2:
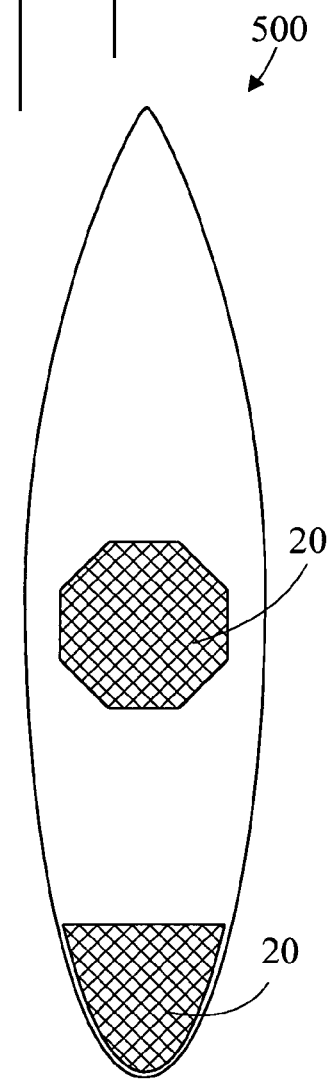

Surfboard Applications:

Currently most surfboard traction pads are made from EVA foams that have a coarsely textured surface (which is abrasive), or an EVA foam that has a molded in texture, which is more slippery than surfboard wax. FIGS. 1 and 2 show application of sheets of the composition 20 of the present invention (the crosshatched portions are the sheets) to the surface of a surfboard 500. The sheets serve as traction pads which can be of various sizes and shapes, and can be placed at any desired location(s) on the surface of the surfboard 500. The pads are commonly bonded with a double sided pressure sensitive adhesive (PSA). The PSA could be a liquid or film which is bonded to the back of the traction pad, and then after removing a protective release material and exposing the opposite side of the PSA, is firmly attached to the deck of the surfboard (or otherwise) to the deck of the surfboard in the user's desired location. Eventually it may be possible to coat the entire deck of a surfboard with the composition of the present invention. The surfboard traction pads of the present invention are low profile, provide excellent wet traction, and are soft and compressible under the chest of surfer when paddling.

Controlling the thickness of the finished product can be critical in end use applications. For example: A traction pad on the rear of the surfboard would be thinner than the one on the nose. The turning power on a surfboard is usually generated from the rear, if the rear pad is too thick it might act to dampen or decouple the transmission of the foot power needed to turn or maneuver the surfboard. Nose riding doesn't require the raw power needed for turning but requires subtle light touches and may benefit somewhat from increased thickness. The finish of the molded parts also plays a part in wet traction, a dulled, satin or flat surface finish in a molded part would enhance wet traction (but more difficult to keep clean). A glossy or shiny finished surface in a molded part is going to be more slippery, easier to keep clean.

Other Applications of the Composition:

Possible applications in skateboarding on the decks of skateboards used in clean environments, such as indoor skate parks and during skateboard competitions where dirt or debris would not accumulate on the traction material. Material would act somewhat like fly paper helping to stick the skater to the deck better, but also being able to give a certain degree of release.

The composition could also be used in the sole of special shoes worn by skateboarders in clean environments.

The composition of the present invention can be injection molded into finished products or by using what are commonly known in the industry as hot melt manufacturing techniques, such as hot melt spray or slot die coaters that apply a dot pattern random or controlled to the bottom of disposable hospital booties or into palm of wet suit gloves to increase wet COF.

In another embodiment of the invention, antimicrobial protection compounds can be added to the present invention at time of manufacture. This is particularly applicable to bath tub/shower mats and also sporting goods. A supplier for such a compound is: Microban International, Ltd., Microban®
11400 Vanstory Drive
Huntersville, N.C. 28078
United States
Ph: +1 (704) 875-0806
Additional Information Regarding TPEs:
Patent Publication US 2008/0097270 discloses in part:
"[0008] In some embodiments, the hardness may be no more than about 30 or 35 Shore 00. For example, a currently favored material for manufacturing the pad is Gel Concepts thermoplastic rubber compound, which is a proprietary, oil-plasticized styrene block copolymer elastomer, manufactured by Gel Concepts L.L.C. of Whippany, N.J., particularly Product No. 4125. This is a transparent material, very soft, with a Shore 00 hardness of about 14 Another useful candidate material is Versaflex® CL 2003x thermoplastic rubber compound, manufactured by GLS Corp. of McHenry, Ill., having a Shore 00 hardness of about 29, and having other physical parameters as described in the above-cited Patent Application Publication No. US2006/0079823 A1, the disclosures of which are incorporated by reference herein."

The embodiments of the method and composition described herein are exemplary and numerous modifications, combinations, variations, and rearrangements can be readily envisioned to achieve an equivalent result, all of which are intended to be embraced within the scope of the appended claims. Further, nothing in the above-provided discussions of the method and composition should be construed as limiting the invention to a particular embodiment or combination of embodiments. The scope of the invention is best defined by the appended claims.

I claim:

1. A composition, comprising:
    a thermoplastic elastomer being about 83.3 to about 93 weight percent;
    a microcrystalline wax being about 2.3 to about 8.3 weight percent;
    an amorphous polyalphaolefin copolymer which includes about 15 weight percent ethylene and 85 weight percent propylene, said amorphous polyalphaolefin copolymer being about 2.3 to about 4.3 weight percent; and,
    an ethylene propylene copolymer wax having a weight average molecular weight of about 650, and having a melting point of about 96° C., said ethylene propylene copolymer wax being about 2.3 to about 8.3 weight percent.

2. The composition according to claim 1, further including:
    said thermoplastic elastomer being about 93 weight percent;
    said microcrystalline wax being about 2.3 weight percent;
    said amorphous polyalphaolefin copolymer being about 2.3 weight percent; and,
    said ethylene propylene copolymer wax being about 2.3 weight percent.

* * * * *